United States Patent [19]

Johnson et al.

[11] Patent Number: 4,980,030

[45] Date of Patent: Dec. 25, 1990

[54] METHOD FOR TREATING WASTE PAINT SLUDGE

[75] Inventors: Jeffrey C. Johnson, Birmingham; Andrew Slater, Troy, both of Mich.

[73] Assignee: Haden Schweitzer, Troy, Mich.

[21] Appl. No.: 202,838

[22] Filed: Jun. 3, 1988

Related U.S. Application Data

[63] Continuation-in-part of Ser. No. 33,184, Apr. 2, 1987, abandoned.

[51] Int. Cl.$^5$ .......................... B01D 1/00; F26B 3/32
[52] U.S. Cl. .......................................... 203/4; 203/40; 203/95; 203/100; 203/DIG. 8; 34/32; 34/40; 34/182; 110/341; 159/16.3; 159/47.3; 159/DIG. 29; 210/806; 427/345; 432/215
[58] Field of Search ............... 427/345; 159/47.3, 16.1, 159/16.3, 24.2, 25.1, DIG. 29, 905, 42, 2.2; 203/100, 4, 40, 87, 95, 25, DIG. 8; 202/169, 178, 168, 197, 176, 182, 175; 201/12, 2.5; 210/634, 806; 55/80; 110/341

[56] References Cited

U.S. PATENT DOCUMENTS

| | | | |
|---|---|---|---|
| 2,152,716 | 4/1939 | Van Wirt et al. | 203/64 |
| 2,755,749 | 7/1956 | Seymour . | |
| 3,442,769 | 5/1969 | Heinz . | |
| 3,653,424 | 4/1972 | Carlsson . | |
| 3,764,013 | 10/1973 | Eisenmann | 210/205 |
| 3,775,041 | 11/1973 | Buttner . | |
| 3,776,774 | 12/1973 | Miller . | |
| 3,800,865 | 4/1974 | Onarheim et al. . | |
| 3,808,701 | 5/1974 | Bachmann . | |
| 3,855,076 | 12/1974 | Marecaux . | |
| 3,926,129 | 12/1975 | Wall . | |
| 4,010,098 | 3/1977 | Fassell . | |
| 4,070,162 | 1/1978 | Kober et al. . | |
| 4,100,066 | 7/1978 | Bloomer et al. . | |
| 4,193,206 | 3/1980 | Maffet . | |
| 4,220,456 | 9/1980 | Block . | |
| 4,220,478 | 9/1980 | Schuff . | |
| 4,261,707 | 4/1981 | Bradshaw et al. . | |
| 4,265,642 | 5/1981 | Mir et al. . | |
| 4,353,715 | 9/1982 | Mir et al. . | |
| 4,367,148 | 1/1983 | Fulton et al. . | |
| 4,378,235 | 3/1983 | Cosper et al. . | |

(List continued on next page.)

*Primary Examiner*—Wilbur Bascomb
*Attorney, Agent, or Firm*—Niro, Scavone, Haller & Niro, Ltd.

[57] ABSTRACT

A method and apparatus are disclosed for the treatment of paint sludge and for reducing volatile organic compound emissions from a paint spraybooth operation, thereby obtaining a recyclable material for use in new coating products. In such an operation, uncured paint resins mixed with volatile organic compounds are sprayed onto an article to be painted and at least a portion of the overspray is mixed with water to form a waste stream containing water, uncured paint resin, volatile organic compounds and inorganic substances. The method includes the steps of: removing a portion of the water and liquid volatile organic compounds from the waste stream; heating the resultant sludge to volatilize the residual water and liquid volatile organic compounds and to cure the uncured paint resin; collecting the residual solids stream, and removing all of the volatilized organic compounds from the resultant stream, thereby generating a volatile organic compound-free gas effluent. The amount of volatized organic compounds removed is at least about 5% of the volatile organic compounds input to the paint spraybooth operation.

The apparatus includes a waste paint stream dewatering device and an enclosed rotary screw heat exchanger maintained in an inert environment; the apparatus also provides a system for adding a scouring aggregate to the sludge before heating and for removing the aggregate after heating. Finally, the apparatus includes a separator for removing entrained solids from the resulting gas stream, and provides a system for processing the gas stream to remove all volatile organic compounds.

14 Claims, 3 Drawing Sheets

U.S. PATENT DOCUMENTS

| | | |
|---|---|---|
| 4,396,405 | 8/1983 | Lindenberger et al. . |
| 4,406,119 | 9/1983 | Kamiya et al. . |
| 4,422,940 | 12/1983 | Cousino et al. . |
| 4,440,674 | 4/1984 | Dieckmann et al. . |
| 4,441,437 | 4/1984 | Moskau . |
| 4,472,181 | 9/1984 | Herrlander . |
| 4,504,395 | 3/1985 | Harpel et al. . |
| 4,544,388 | 10/1985 | Rao et al. . |
| 4,545,295 | 10/1985 | Russell . |
| 4,563,199 | 1/1986 | Lindenberger et al. . |
| 4,563,274 | 1/1986 | Rothon et al. . |
| 4,569,682 | 2/1986 | Baker, Jr. et al. . |
| 4,579,596 | 4/1986 | Murzyn . |
| 4,610,785 | 9/1986 | Russell . |
| 4,629,572 | 12/1986 | Leitz et al. . |
| 4,637,824 | 1/1987 | Pominville . |
| 4,686,003 | 8/1987 | Hockings et al. . |
| 4,708,775 | 11/1987 | McGregor et al. . |
| 4,750,274 | 6/1988 | Erdman et al. .......................... 34/39 |

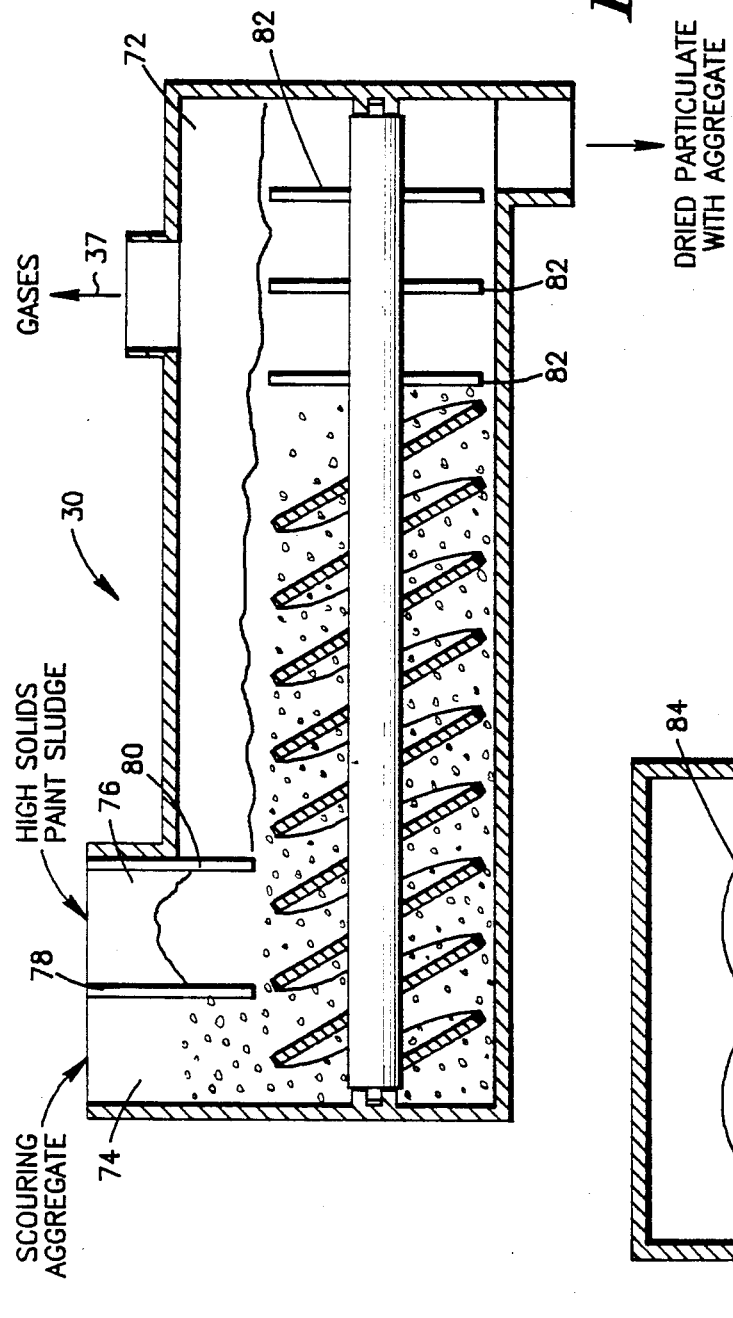
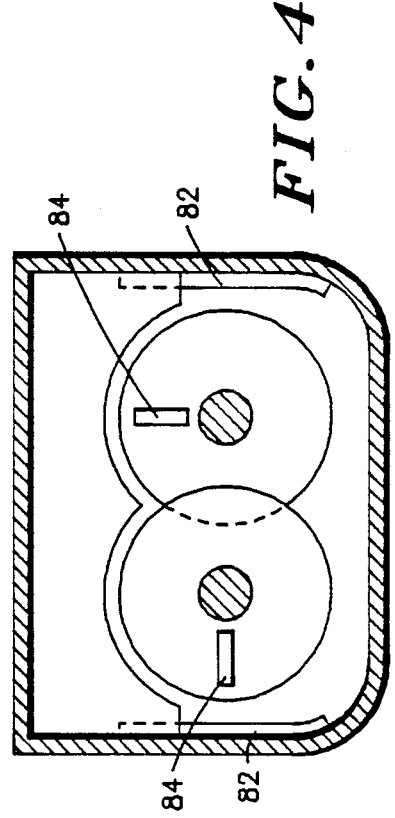

METHOD FOR TREATING WASTE PAINT SLUDGE

This application is a continuation-in-part of U.S. application Ser. No. 033,184 filed Apr. 2, 1987 now abandoned.

BACKGROUND OF THE INVENTION

This invention relates to a method and apparatus for treating a waste stream from a painting operation and, more particularly, to a method and apparatus for processing waste paint sludge, to dry it, remove volatile organic compounds, substantially reduce its weight and volume and to produce a recyclable product.

Treatment of waste in industrial facilities causes a variety of environmental and economic problems. Over the years, increasingly stringent governmental pollution regulations as well as the increased cost of waste disposal have led to escalating concern in the treatment and disposal of waste. The difficulty in disposing of waste materials is exacerbated when the waste includes both organic substances, in the form of hydrocarbons, and inorganic substances. In these circumstances it is desirable to remove the hydrocarbons or at least the volatile organic compounds ("VOC") from the waste before disposal, yet the processing of the hydrocarbon constituents can be troublesome and expensive when the hydrocarbons are still mixed with other inorganic constituents. Furthermore, recently enacted laws regulating the disposal of waste have substantially reduced the amount of hazardous or toxic waste which may be generated and disposed of by individual industrial facilities.

Particularly difficult problems in the treatment of waste are found in the design of paint spraybooth facilities where a large volume of paint overspray and resultant paint sludge waste is generated. Paint sludge includes both organic and inorganic constituents and also substances which are intended to coalesce into a film; these coalescing substances typically make paint sludge very sticky and difficult to handle. Thus, as paint sludge is dewatered and otherwise concentrated, for example by drying, it becomes increasingly more difficult to transport through the heating and conveyance equipment. As a result, no economical and effective method or apparatus has been available for treatment of paint waste sludge. Instead, it has been disposed of by deposit in hazardous waste sites This is an undesirable solution because of cost and potential environmental pollution.

In addition, paint spraybooth facilities generate a very substantial volume of VOC. A typical automotive paint facility may emit as much as 1500 tons of VOC per year at an estimated cost of between $2000 to $5000 per ton. Moreover, VOC emissions from such facilities are subject to stringent environmental control. As a result, a great variety of equipment and methods have been developed to reduce VOC emissions from paint spraybooth facilities. These prior art systems, however, are generally expensive and troublesome to operate. In fact, most such paint facilities are barely able to maintain legal operation because applicable laws are stringent as compared to available technology. No prior art system has been developed which reduces VOC emissions through treatment of the waste paint sludge.

It is therefore desireable to provide a method and apparatus which effectively and economically treat the waste stream or sludge from a paint operation. It is also desirable to provide a method and apparatus which reduce VOC emissions and minimize the weight and volume of waste paint sludge while substantially eliminating its hazardous characteristics.

It has also proven very difficult, if not impossible, to economically and effectively generate a recyclable material from paint sludge. Prior art paint sludge treating systems have not removed all residual water and include substantial amounts of uncured paint resin. These materials may vary in chemistry and amount depending upon the particular painting facility or specific paint formulation being used. Because these materials may also react with other components in new paint or coating products, they are viewed as reactive contaminants. Thus, the discharged product from prior art paint waste treatment systems have not been considered useful as a recyclable material.

SUMMARY OF THE INVENTION

The present invention is directed to a method and apparatus for treating waste paint sludge including water, uncured resin and liquid hydrocarbons The present invention is also directed to a method and apparatus for reducing VOC emissions from a paint spraybooth facility by treatment of the waste paint stream in a quantifiable or measurable manner. In accordance with the present invention, the waste material, typically in the form of a sludge, is processed in a heating and resin curing procedure whereby the water and VOC, in the form of liquid hydrocarbons, are evaporated so that the solids discharged after heating are in a substantially dried particulate solids form. The resulting gas stream generated by the heating and curing step may then be processed separately from the solids stream by simple and relatively inexpensive means.

The present invention is directed further to a method and apparatus for treating waste paint sludge which significantly reduces its hazardous characteristics. Further, the method and apparatus of the present invention cures the resin component of the paint waste sludge and reduces it to a powdered form having substantially less weight and volume which makes its disposal easier and more economical.

While paints are chemically distinct in their liquid form, most of the differences are significantly reduced when the paint system is cured. All cured paints are relatively similar in hardness, chemical resistance, and other distinguishing physical and performance characteristics. In the cured form the paint is substantially inert, or is almost non-reactive. Thus, paints which cannot be mixed as liquids because the chemistry is incompatible may be mixed freely as powders once they have been cured, since they will no longer react with each other. This permits the recycling of the cured paint powder resulting from the process of the present invention. Typically, this substantially dried particulate cured resin material may be used in other new products such as paints, primers, moldable plastics, roofing material and asphalt.

It is therefore one object of the present invention to treat a waste paint sludge to obtain a resultant solid particulate material which is useful as a constituent in the formulation of new paints, coating materials and other related products.

It is another object of the invention to provide a method and apparatus for the treatment of waste sludge which will reduce VOC emissions from an industrial paint shop facility in a quantifiable manner.

It is still a further object of the present invention to provide a method and apparatus for the treatment of waste paint sludge wherein the hazardous characteristics are reduced because potentially toxic materials in the sludge, particularly heavy metals, are bound into the cured resin product which results from the process of the present invention.

Another object of the present invention is to provide a method and apparatus for the treatment of waste paint sludge with a substantially reduced risk of fire or explosion.

In the preferred embodiment of the invention, waste paint sludge comprising water, uncured polymeric paint resins, organic solvents such as liquid hydrocarbons, and inorganic substances is processed to remove some of the liquids to thereby produce a high solids paint sludge. The high solids sludge is then heated in an enclosed chamber to drive off any remaining water and liquid hydrocarbon components. As a result, the solids stream discharged from the heating chamber is substantially dry, having a solids content approaching 100%. This dried product, typically in particulate form, has a greatly reduced weight and volume as compared to the initial sludge and substantially reduced toxicity. The hydrocarbons present in the gases generated by the heating step may be eliminated by incineration or condensation.

In a further preferred embodiment, the high solids paint sludge is mixed with a scouring aggregate to create a processing mixture which exhibits improved manageability for further processing. The processing mixture is passed through a rotary screw heat exchanger to heat the mixture and volatilize the residual water and liquid hydrocarbons contained in the mixture. A dried particulate product having substantially reduced weight, volume and toxicity is discharged from the heat exchanger. This dried particulate contains the scouring aggregate which may be separated from the dried particulate product. In some instances it may be desirable to dispose of both the dried particulate product and the scouring aggregate together, or direct the discharged dried particulate product and scouring aggregate for further processing.

In an additional embodiment of the invention, a positive steam pressure is maintained in the heating chamber over the paint sludge and aggregate mixture to form an inert environment for prevention of fires or explosions.

BRIEF DESCRIPTION OF THE DRAWINGS

The novel features of the invention are set forth in the appended claims. However, the preferred embodiments of the invention, together with further objects and attendant advantages thereof, will be best understood by reference to the following description taken in connection with the accompanying drawings in which:

FIG. 3 is a longitudinal cross-sectional view of one preferred rotary screw heat exchanger and related apparatus found useful in the practice of the present invention; and FIG. 4 is a lateral cross-sectional view of the heat exchanger depicted in FIG. 3.

DESCRIPTION OF THE PREFERRED EMBODIMENTS

It will be appreciated by those skilled in the art that the waste paint sludge treated in accordance with the present invention is a complex material and different from most other waste sludges. First, it can include a variety of liquid hydrocarbons, that is, VOC, such as solvents, thinners and detackifying agents. It will also typically include uncured polymeric paint resins which "cure", that is cross-link, and form a film upon heating and volatilization of liquid carriers. Thus, paint sludges usually become very sticky when partially dried. Further, paint sludge can include inorganic substances such as heavy metals, fillers, metal flakes and, of course, pigments. Any one or all of these components may be classified as hazardous or toxic. It will also be appreciated that in some instances paint sludge will contain a very substantial organic component and very little inorganic material. For example, in some cases the only inorganic component may be paint pigment. All of these types of paint sludges may be treated in accordance with the present invention.

Figure 1:
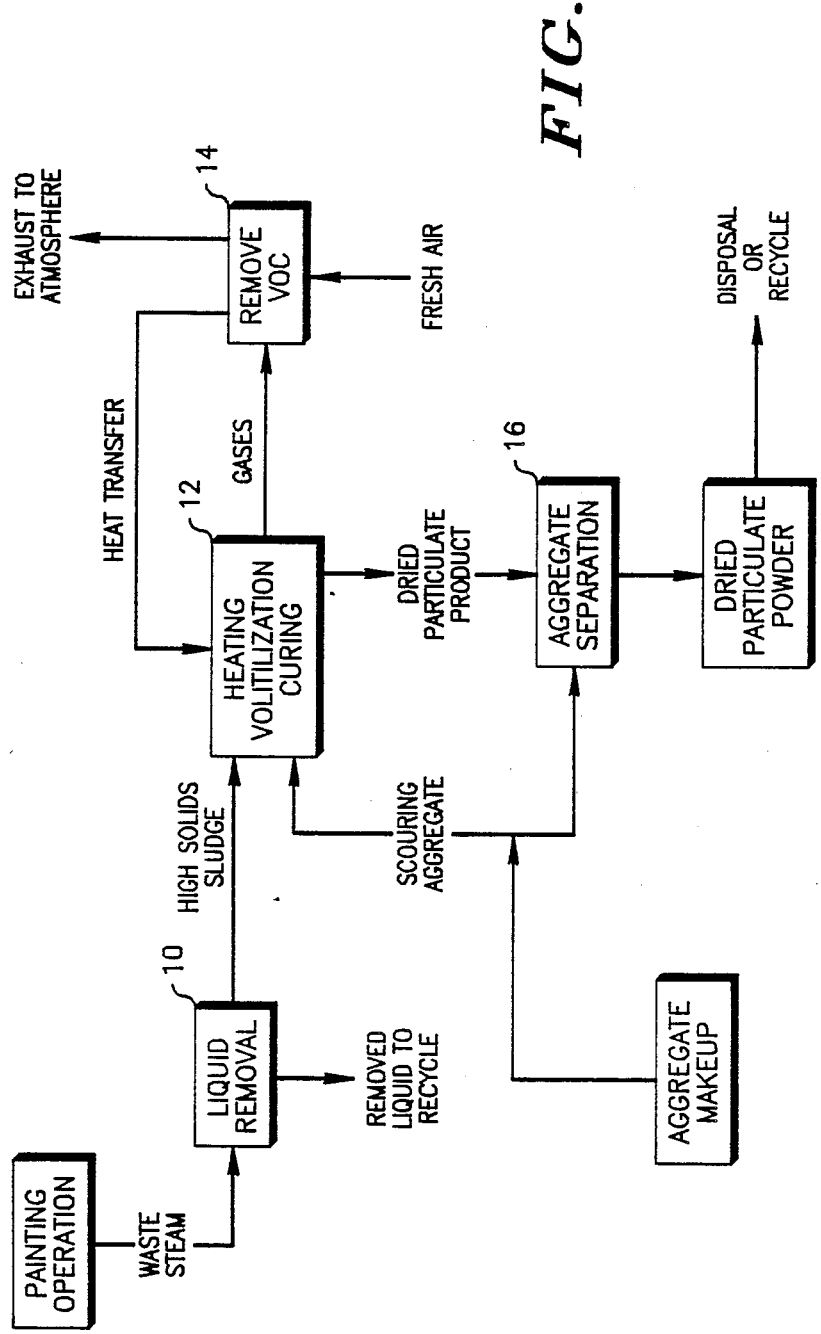
FIG. 1 is a block diagram representing the steps of the method of the present invention.

Referring now to FIG. 1, the steps of the method of the present invention are depicted in block diagram form. The waste stream from a paint operation typically with less than about 10% solids content, is first processed to remove some of the liquid as indicated at 10. The separated liquid may then be recycled to the paint finishing facility for reuse. One such arrangement useful in this step and causing paint sludge to raft on the surface of a collecting tank, is disclosed in U.S. Pat. No. 4,100,066 to Bloomer et al. It is desireable to dewater the waste paint sludge as much as possible prior to employing the further steps of the method. The resulting concentrated paint sludge, with a solids content of between about 15% and 40%, is then conveyed to and through a heating chamber at 12 where it is heated to about 250° to 350° F., to cure the polymeric paint resins and volatilize residual water and the VOC or liquid hydrocarbons. In this way, the gaseous hydrocarbons may be subsequently processed separately from the remaining solids stream. Any number of different heating techniques may be employed at step 12. For example, rotary kilns, flat bed ovens, infrared heaters and indirect heat exchangers may be used. As explained later, a hollow flight, rotary screw heat exchanger maintained in an inert environment is particularly preferred.

As a result of the sludge heating step 12, a dried particulate product is obtained having a solids content approaching 100% and substantially reduced volume and weight. It is important that the sludge be retained within the heating chamber for a time and at a temperature sufficient to completely cure all of the uncured paint resin contained within the sludge. For a conventional automotive paint sludge having a solids content of about 25% a suitable bulk temperature for the sludge is approximately 325° F. with a residence time in the heating chamber of about 30 minutes.

The resultant particulate product will therefore have a substantially inert resin component which is necessary for recycling of the dried particulate powder into other new materials, and particularly into new paints. It has been found that when the resin component of the dried particulate is completely cured, the material may be used satisfactorily as a filler in paints and other coatings, and this is particularly desirable in order to enhance the economies of the waste treatment system. "Particulate product" as used herein is intended to mean not only powders but also relatively large pieces of solid cured resin material which are sufficiently frangible to be later pulverized or ground to a powdered form. In addition, "substantially dried" particulate is intended to mean that the material is free-flowing and not tacky.

Various well known methods may be used to process the gas stream from the heating step and to remove VOC and substantially reduce or eliminate the adverse environmental impact of these gases. Such methods, indicated at 14, include, but are not limited to, heating the discharged gas to a temperature high enough to incinerate its hydrocarbon components. In practice, it has been determined that these hydrocarbons may be incinerated at a temperature of about 1500° F. In order to enhance the energy efficiency of the process, it may be desirable to transfer a portion of the heat generated during this incineration step to the heating medium which passes through the heat exchanger used in the heating step.

Another method of processing the gas after it is discharged from the heating chamber is by condensing the VOC. The VOC condensate may then be either recycled or incinerated.

In accordance with a further embodiment of the invention, the high solids paint sludge is mixed with a scouring aggregate before processing through the heating chamber. A variety of scouring aggregates can be mixed with the waste paint sludge to create the desired processing mixture. Such scouring aggregates may include, but are not limited to, metal particulate, rock salt, gravel, coal, or similar scouring particles. Additionally, the scouring aggregate may be a frangible material which may be separated by any well known method, indicated at 16, from the dried particulate product obtained upon discharge from the heat exchanger. The scouring aggregate and paint sludge solids are preferably mixed at a ratio of about 1:1 prior to conveyance through the heating chamber in step 12. The dried particulate product and scouring aggregate mixture discharged from the volatilization step has a solids content approaching 100%. Further details of this aspect of the method of the present invention are described in co-pending application Ser. No. 007,156, now U.S. Pat. No. 4,750,274 entitled "Sludge Processing", the disclosure of which is incorporated herein by reference.

Figure 2:
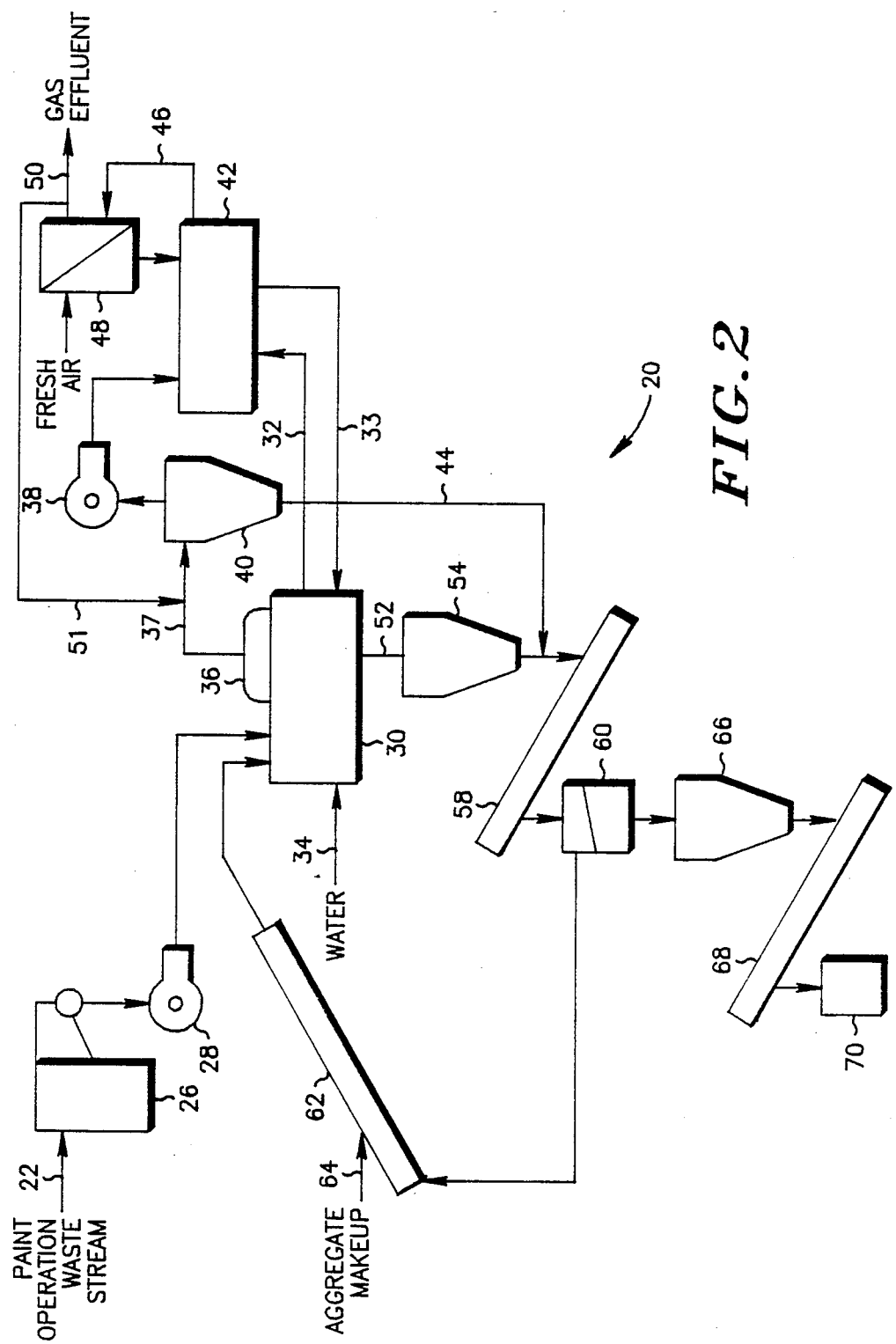
FIG. 2 is a schematic diagram illustrating one embodiment of an apparatus which may be used to carry out the method of the present invention.

Turning now to FIG. 2, an exemplary embodiment of the paint sludge treating system, generally designated 20 is shown. The paint waste stream 22 described above, is supplied to a dewatering device 26, which may comprise a rotating strainer, for removing some of the liquid from the paint sludge. The resulting high solids sludge is conveyed by a hydraulically driven piston pump 28 to heating chamber or heat exchanger 30. As will be appreciated by those skilled in the art, heat exchanger 30 may be of the direct or indirect type. For purposes of describing the exemplary embodiments of the invention herein, heat exchanger 30 is an indirect rotary screw heat exchanger which may include one or more hollow flights through which a heating medium is supplied via circulating lines 32 and 33. The heating medium may comprise oil, water or similar heat exchanging media. This type of indirect heat exchanger is more fully described in copending U.S. Pat. application Ser. No. 007,156, now U.S. Pat. No. 4,750,274, the disclosure of which is incorporated herein by reference.

The method and apparatus of the present invention makes use of a scouring aggregate which is supplied to and mixed with the paint sludge either before or as it enters the heat exchanger 30. This scouring aggregate, as described more fully in U.S. Pat. application Ser. No. 007,156, now U.S. Pat. No. 4,750,274, acts to reduce scaling and deposition of the solid materials of the sludge onto the surfaces of the heat exchanger during the heating step. As a consequence, heat is transferred more efficiently to the sludge, thereby facilitating the cure of the resin component and volatilization of the liquid component of the sludge.

Thus, as the mixture is passed through heat exchanger 30, it is heated, the residual liquids are volatilized and a dried particulate product with substantially cured resin is created having substantially reduced volume and weight. Moreover, the toxicity of the sludge is substantially reduced because heavy metals are bound within the cured resins.

In accordance with the present invention, the heating chamber 30 is enclosed and substantially sealed in order to permit the maintenance of an inert environment. This inert environment is created by the generation of steam, both from the sludge itself during the heating process and if necessary through the injection of water via line 34 into the heating chamber. Alternatively, the heating chamber may be purged with a gas to maintain the concentration of flammable gaseous components in said heating chamber below the lower explosion limit. The inert environment serves to exclude oxygen from chamber 30, thereby eliminating substantially any risk of fire or explosion.

All of the gases generated in the heating step are collected in the vapor dome 36 of the heating chamber 30 and drawn by fume fan 38 via line 37 through a cyclone separator 40 and ultimately to a gas processing zone 42. In separator 40 all entrained solid materials carried from the heating chamber 30 are separated from the gas stream and delivered via conduit 44 to the discharge solids stream of the heating chamber. In the preferred embodiment, the gas stream processing zone 42 is a gas fired burner which incinerates all the combustible materials in the gas stream exiting the heating chamber 30. These combustible materials are primarily VOC and, as a result, the gas effluent leaving processing zone 42 via line 46 is a substantially VOC free or hydrocarbon free effluent. Incineration of VOC in processing zone 42 generates temperatures on the order of 1500° F. Preferrably, the heating medium is transported from processing zone 42 to heating chamber 30 via line 32 and then back via line 33 at a flow rate sufficient to maintain its temperature within the range of 500° to 600° F. In order to further enhance the economies and energy efficiency of the system the hot VOC free gas effluent passes from line 46 through a heat exchanger 48, where it heats the fresh air used in the incineration process, before being discharged to the atmosphere via line 50. As noted earlier, and particularly where incineration may be impractical, processing zone 42 may employ a condenser unit in order to remove substantially all of the VOC from the gas stream being discharged from the heating chamber 30.

A conduit 51 is also provided which directs a portion of the effluent otherwise exiting to atmosphere to recycle to the input side of separator 40. This recycle of gas effluent serves several functions. First, because the effluent is quite hot, perhaps 600° F., it will maintain a sufficient temperature in separator 40 to prevent condensation of water from the superheated gas entering via line 37. Second, it assists in stabilizing gas flow through the separator 40 thereby enhancing its efficiency. Thirdly, it serves to stabilize pressure conditions within heating chamber 60 as described in greater detail below.

The solids stream discharged from the heating chamber 30 passes via conduit 52 into a hopper or accumulator 54. The capacity of accumulator 54 is sufficient to hold the entire contents of heating chamber 30. One purpose of accumulator 54 is to permit short or temporary shut-down of the system without substantial disadvantage. When the drive to the rotary screw heat exchanger is turned off with the heat exchanger full of the sludge and aggregate, the mixture of course continues to dry and will ultimately become quite hard. In this event, upon trying to restart the dryer there may be too much torque required to turn the rotary screws. Moreover, sludge held in the heating chamber which is not operating may overheat and catch fire. For these reasons, if any part of the system breaks down, all conveyors and other transporting systems may be turned off except for the heating chamber itself The rotary screws may continue to rotate and discharge the dried content of the heating chamber into hopper 54, thus completely emptying the rotary screw heat exchanger 30. Under these circumstances, it may be necessary to inject additional water via conduit 34 into the heating chamber 30 to maintain proper steam pressure which, as noted earlier, should be slightly above atmospheric pressure.

The mixture of dried particulate product and scouring aggregate is then transported via intermediate conveyor 58 to a separator 60. The scouring aggregate which is separated from the discharge solids stream is then delivered to conveyor 62 which, in turn, recycles the aggregate to heating chamber 30. If necessary, any additional aggregate required to maintain a proper sludge/aggregate mixture in heating chamber 30 may be added to recycling conveyor 62 via aggregate makeup conduit 64.

The solids stream exiting from separator 60 is preferably in the form of a relatively fine powder, which may be collected in hopper 66 and ultimately delivered via conveyor 68 to a bagging operation 70 or other conventional means for collection, storage or disposal.

In the event insufficient steam is generated in chamber 30 to satisfy the capacity requirements of fume fan 38, makeup gas will be drawn from line 50 via conduit 51. In this way, pressure within chamber 30 will not drop substantially but may be maintained close to or slightly above atmospheric pressure, thereby minimizing the aspiration of ambient air into chamber 30 with its concomitant risk of fire and explosion.

Alternatively, chamber 30 may be purged with sweep air to maintain the solvent concentrations within chamber 30 below the lower explosion limit.

With reference now to FIG. 3, a particularly preferred form of the rotary screw heat exchanger and chamber 30 is illustrated. The heat exchanger 30 includes a housing which defines an enclosed and substantially sealed chamber 72 in which one or more rotary screw type conveyors are mounted. The scouring aggregate and high solids paint sludge are fed into chamber 72 via inlets 74 and 76, respectively. In accordance with the present invention, the scouring aggregate is fed into chamber 72 upstream of the inlet for the paint sludge. Moreover, the inlets for the aggregate and sludge are defined by vertically depending wiers 78 and 80 which extend to lower free ends positioned immediately adjacent the flights of the rotary screw. Wiers 78 and 80 serve to force both the scouring aggregate and paint sludge down into the flights of the rotary screw. Moreover, because the paint sludge is delivered to chamber 72 downstream of the scouring aggregate and by virtue of the positioning of wiers 78 and 80, the dust and airborne materials associated with the scouring aggregate are prevented from entering into chamber 72, thereby substantially reducing the entrained solids content of the gases exiting chamber 72 through conduit 37.

The rotary screw heat exchanger depicted in FIG. 3 is also equipped with vertically extending side bars 82 which are positioned along the length of chamber 72. Side bars 82 serve to redirect the aggregate and sludge mixture away from the sidewalls of the chamber and into the flights of the rotary screws. This serves to improve the heat transfer from the rotary screws to the sludge thereby speeding the drying and curing process. In addition, the flights of the screws include drag bars 84 mounted on the driving surfaces of the rotary screw flights. The drag bars 84 are known as conveyance cutters because they tend to slow the conveyance of the material and thoroughly mix the material as it passes through the heat exchanger toward discharge. In accordance with the present invention, the drag bars are positioned on the flights of the rotary screws at varying distances, and specifically, at 270° spacings along the input half of chamber 72 and at 135° spacings along the discharge half of the chamber. Because the drag bars serve to slow the conveyance of the material, the closer spacing along the discharge half of the chamber serves to maintain a relatively constant level of aggregate and sludge within chamber 72. Without the use of drag bars 84 the level of the mixture being treated in chamber 72 would drop as it passed toward the discharge end of the chamber primarily due to the evaporation and volatilization of substantial amounts of liquid contained in the incoming paint sludge. Thus, the drag bars, as in the case of side bars 82, serve to increase heat transfer by maintaining intimate and substantial contact between the paint sludge and aggregate mixture on the one hand and the flights of the rotary screw on the other.

The operation of the method and apparatus of the present invention affords significant advantages to industrial paint finishing operations not previously available. First, a recyclable material is obtained which is not a waste or hazardous substance, but rather may be used to economic advantage in new products. For a typical automotive paint finishing operation this can reduce hazardous waste disposal by approximately 150,000 gallons or almost 3000 barrels per year. Second, a reduction in VOC emissions of between 5% and 10% of the VOC input to the paint finishing operation can be achieved. This represents a cost savings of between about $250,000 and $500,000 per year for a typical automotive paint finishing operation. As important, the amount of reduced VOC emissions is quantifiable or measurable so that the operator of the paint finishing facility may report and take credit for this reduction in VOC emission. Finally, the apparatus of the present invention is relatively inexpensive and requires only a small area for proper operation. Thus, significant environmental and economic efficiencies may be achieved without a substantial capital investment.

From the foregoing, it will be appreciated that numerous variations and modifications may be affected without departing from the true spirit and scope of the subject invention. It is understood that no limitation with respect to the specifically described method and apparatus is intended or should be inferred. Rather, it is intended that all such modifications should be included within the scope of the claims.

We claim:

1. A method for the treatment of paint waste sludge containing water, uncured polymeric paint resin, liquid hydrocarbons, and inorganic substances, said method comprising the steps of: removing a portion of the water and liquid hydrocarbons from said sludge thereby producing a high solids paint sludge; heating said high solids paint sludge within a closed container while maintaining a substantially inert environment of steam, to a temperature between 250° and 350° F., so as to volatilize any remaining water and liquid hydrocarbon and to cure substantially all of said uncured resin, thereby generating gases and a substantially dried particulate product comprising cured resin and inorganic substances, charging the container with supplemental water to maintain a steam pressure within said container close to or slightly above atmospheric pressure; transferring said gases from said inert environment to a processing zone wherein substantially all hydrocarbons are removed from said gases thereby generating a hydrocarbon-free effluent; and collecting said substantially dried particulate product.

2. A method for the treatment of a waste stream from a painting operation wherein said waste stream contains water, uncured polymeric paint resin, liquid hydrocarbons and inorganic substances, said method comprising the steps of: removing a portion of the water and liquid hydrocarbons from said waste stream thereby producing a high solids paint sludge; recycling at least a portion of said removed water and liquid hydrocarbon to said painting operation; transporting said high solids paint sludge to an enclosed and substantially sealed rotary screw heat exchanger; maintaining a substantially inert environment within said enclosed rotary screw heat exchanger, wherein said inert environment is steam and wherein supplemental water is charged to said rotary screw heat exchanger to maintain a steam pressure within said heat exchanger close to or slightly above atmospheric pressure; mixing an inorganic scouring aggregate with said high solids paint sludge and thereafter heating said mixture in said rotary screw heat exchanger to volatilize any remaining water and liquid hydrocarbon and to cure substantially all of said uncured resin, thereby generating a gas stream and a substantially dried particulate solids stream including said scouring aggregate; transporting said gas stream through a separator to remove entrained solids and adding said removed entrained solids to said solids stream; incinerating said gas stream to thereby generate a hydrocarbon-free effluent; removing said scouring aggregate from said particulate solids stream and recycling said removed scouring aggregate to said mixing step; and collecting said residual dried particulate solids.

3. A method for the treatment of paint waste sludge containing water, uncured polymeric paint resin, liquid hydrocarbons, and inorganic substances, said method comprising the steps of: removing a portion of the water and liquid hydrocarbons from said sludge thereby producing a high solids paint sludge; heating said high solids paint sludge to volatilize any remaining water and liquid hydrocarbon and to cure substantially all of said uncured resin, thereby generating gases and a substantially dried particulate product comprising cured resin and inorganic substances, said heating step being carried out in an enclosed heating chamber wherein said chamber is purged with a gas to maintain an inert environment in which the concentration of flammable gaseous components in said heating chamber is maintained below an explosion limit; transferring said gases from said inert environment to a processing zone wherein substantially all hydrocarbons are removed from said gases thereby generating a hydrocarbon-free effluent; and collecting said substantially dried particulate product discharged from said heating chamber.

4. The method of claim 3 wherein said purging gas is steam.

5. The method of claim 3 wherein supplemental water is periodically charged to said heating chamber to generate said purging gas and maintain said purging gas at or above a predetermined pressure level.

6. The method of claim 3 wherein the temperature of said heating chamber is between 250° and 350° F.

7. The method of claim 3 wherein said dried particulate product is recycled for use in a new product.

8. The method of claim 3 wherein said heating step is carried out at a pressure above atmospheric pressure.

9. The method of claim 3 wherein said gases are incinerated in said processing zone and wherein at least a portion of the heat generated by said incineration is transferred to and used in said heating step.

10. The method of claim 3 wherein volatile organic compounds in said gases are condensed within said processing zone to generate a volatile organic compounds condensate.

11. The method of claim 3 wherein said heating step is carried out in an enclosed hollow-flight rotary screw heat exchanger, and said high solids paint sludge is mixed with a scouring aggregate as it is heated in said heat exchanger.

12. The method of claim 11 wherein at least a portion of said scouring aggregate is separated from said dried particulate product after said heating step, and said separated aggregate is recycled for mixing with said high solids paint sludge.

13. The method of claim 3 wherein said gases are passed through a separator to remove entrained solids before said gases are transported to said processing zone, and said removed solids are added to said dried particulate product.

14. The method of claim 13 wherein a portion of the effluent of said gases are recycled back to the input of said separator.

* * * * *